C. L. BERGEMAN.
LAWN MOWER.
APPLICATION FILED AUG. 20, 1908.

923,403.

Patented June 1, 1909.
2 SHEETS—SHEET 1.

Witnesses

Inventor
C. L. Bergeman

By ____, Attorneys

C. L. BERGEMAN.
LAWN MOWER.
APPLICATION FILED AUG. 20, 1908.
923,403.
Patented June 1, 1909.
2 SHEETS—SHEET 2.
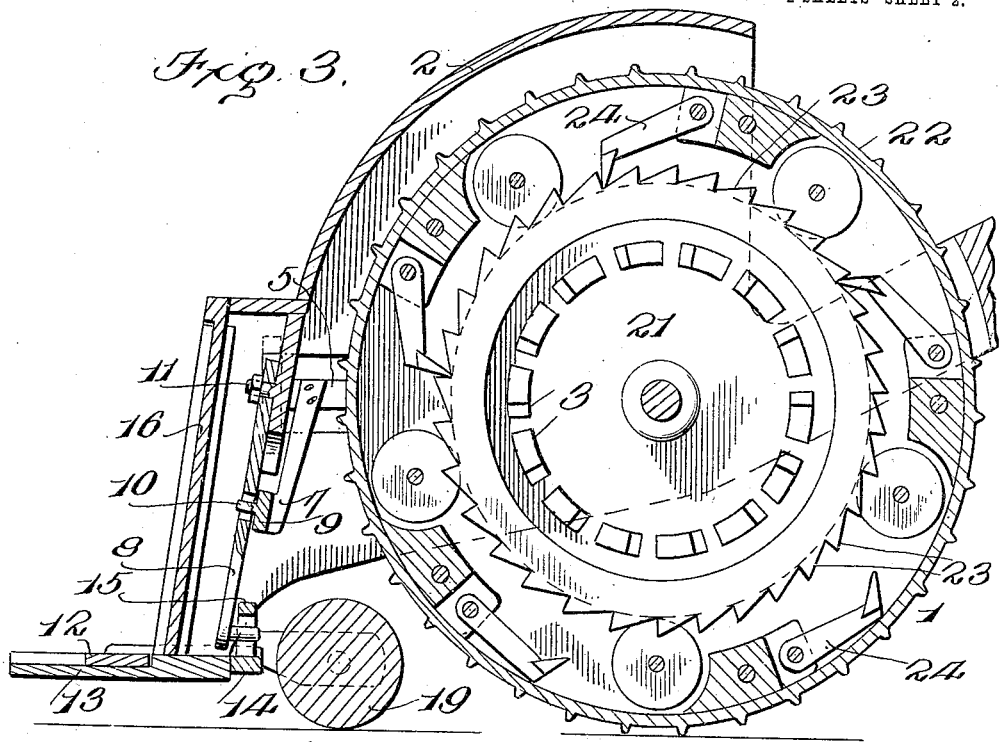
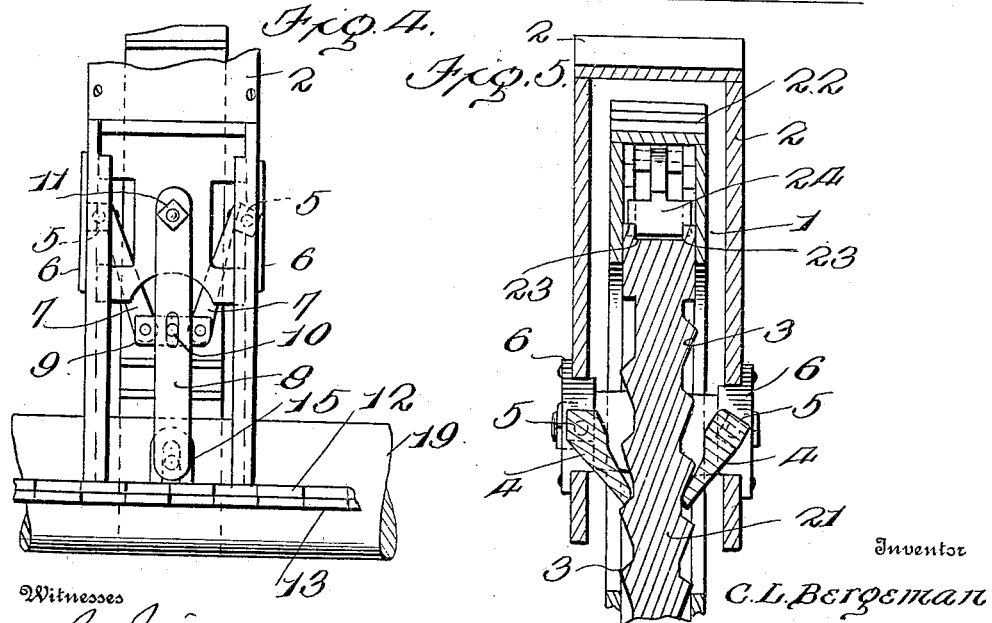
Witnesses
Inventor
C. L. Bergeman
By R. Wall Lacey, Attorneys

UNITED STATES PATENT OFFICE.

CHARLES L. BERGEMAN, OF POTTSVILLE, PENNSYLVANIA.

LAWN-MOWER.

No. 923,403. Specification of Letters Patent. Patented June 1, 1909.

Application filed August 20, 1908. Serial No. 449,438.

*To all whom it may concern:*

Be it known that I, CHARLES L. BERGEMAN, citizen of the United States, residing at Pottsville, in the county of Schuylkill and State of Pennsylvania, have invented certain new and useful Improvements in Lawn-Mowers, of which the following is a specification.

This invention comprehends certain new and useful improvements in mowing machines of that type in which the cutting mechanism consists of a cutter bar that is arranged to reciprocate upon a relatively stationary finger bar, and the object of the invention is a simple, durable and efficient construction of device of this character which is designed particularly for use as a lawn mower and is susceptible of cutting around the edges of the lawn and up close against a fence or the like, and which embodies peculiar means for transmitting motion from the drive wheel to the cutter bar to effect the automatic reciprocation of the same as the machine travels over the ground.

With this and other objects in view that will more fully appear as the description proceeds, the invention consists of certain constructions, arrangements and combinations of the parts that I shall hereinafter fully describe and then point out the novel features thereof in the appended claims.

Figure 1:
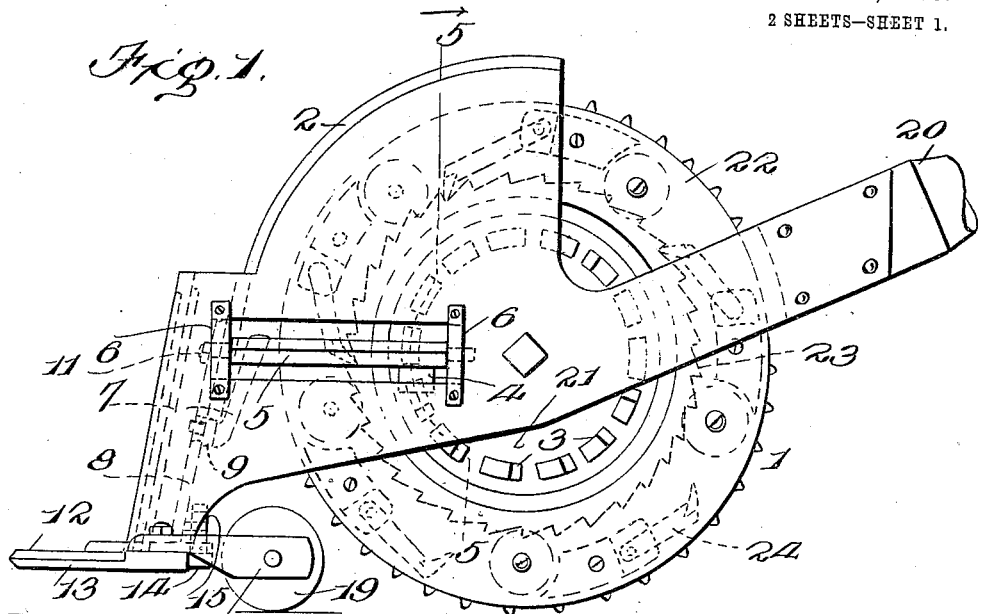
Figure 2:
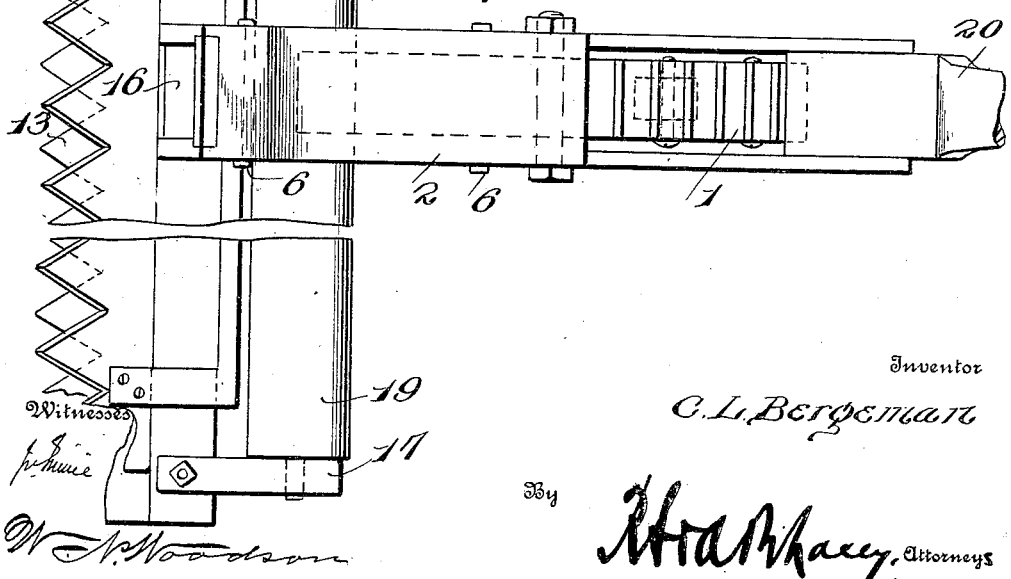

For a full understanding of the invention, reference is to be had to the following description and accompanying drawing, in which:

Figure 1 is a side elevation of a mowing machine constructed in accordance with my invention. Fig. 2 is a top plan view thereof. Fig. 3 is a longitudinal section. Fig. 4 is a detail view of the rocking lever and the parts operatively connected thereto, the detachable section of the frame being removed, and Fig. 5 is a section on the line 5—5 of Fig. 1.

Corresponding and like parts are referred to in the following description and indicated in all the views of the drawings by the same reference characters.

In carrying out my invention, I provide a drive wheel 1 which may be of any desired or approved construction, or design, except as hereinafter noted, and which is rotatably mounted in a suitable framework 2 and is designed to be partially incased thereby so as to be prevented from becoming clogged or entangled with the herbage. This drive wheel is preferably solid and is formed on opposite sides with annular series of ratchet teeth 3 that are so arranged that the teeth of one series are in transverse alinement with the spaces between the teeth of the other series. The teeth of the respective series are designed to be engaged by pawls 4 carried by and rigidly secured to the rear ends of horizontally disposed rocking shafts 5 that are rotatably mounted in suitable journals 6 in the framework upon opposite sides of the wheel, and that extend forwardly beyond the same, as shown. At their forward ends, the rocking shafts are formed with depending crank arms 7 that are designed to be connected together and to a rocking lever 8 in any suitable manner, and in the present instance a link 9 is employed for this purpose and is operatively connected to the respective crank arms and is formed intermediate of its ends with a forwardly disposed pin or stud 10 that is loosely mounted in the rocking lever at an intermediate point thereof. This rocking lever is fulcrumed at its upper end on a forwardly disposed post 11 carried by the framework, and has its lower end pivotally connected to a cutter bar 12 in any suitable manner so as to be rendered capable of effecting the reciprocation of the same upon a horizontally disposed finger bar 13 that is rigidly secured to the forward end of the framework 2 in close proximity to the ground. The cutter bar 12 is preferably frame-like in construction and embodies a cross bar 14 which is arranged in the rear of and parallel to the finger bar 13 and which passes loosely between the sides of the framework and is provided between the same with an upwardly disposed lug 15 to which the lower end of the rocking lever 8 is pivotally connected, the front end of the framework being preferably provided with a door or other detachable section 16 to afford ready access to the rocking lever and the parts operatively connected thereto.

In the present instance, the finger bar 13 is provided at its ends with rearwardly disposed brackets 17 in which are rotatably mounted the end gudgeons of a relatively small transversely disposed roller 19 that is interposed between the cutting mechanism and the drive wheel 1 and that in addition to rolling the herbage after the same has been cut, also serves to steady the machine and sustain the cutting mechanism at a constant distance from the ground to insure the cutting of the grass or the like at a uniform length.

As before stated, this machine is designed particularly for use as a grass cutter, and is preferably provided with a suitable handle 20 which is rigidly secured to the framework and is designed to render the machine susceptible of manual operation, but, however, it is to be understood that I do not restrict myself to any means for propelling the machine over the ground, but in cases where a great deal of mowing is to be done I may provide the machine with a motor, or, if desired, the framework 2 may be connected to any suitable draft appliance to permit the machine to be propelled by a horse or other draft animal.

From the foregoing description in connection with the accompanying drawing, it will be manifest that as the driving wheel 1 rotates during the forward movement of the machine, one of the pawls 4 will be pressed laterally in one direction by one of the teeth 3 of the corresponding series, and this movement will effect the partial rotation of the rocking shaft 5 and the lateral movement of the corresponding crank arm 7 in a direction similar to the direction of movement of the pawl. This movement of the crank arm obviously effects the oscillation of the rocking shaft 8 and the consequent reciprocation of the cutter bar 12, and also moves the other crank arm 5 in a similar direction through the instrumentality of the link 9, whereby to swing the other pawl 4 into the space between two ratchet teeth of the adjacent series and into operative relation to such teeth so that the continued rotation of the driving wheel will effect a repetition of the above described operation.

In order to prevent the mowing machine from operating when it is drawn backward, any suitable or approved means may be employed, such as constructing the drive wheel 1 in hub and rim sections 21 and 22, the former being loosely encircled by the latter and being provided with the annular series of teeth 3 and being also formed in its periphery with a series of teeth 23 which are designed to be engaged upon the forward rotation of the drive wheel by detents 24 carried by the rim section 22 so as to secure the latter to the hub section and cause the same to rotate together. Upon the movement of the machine in the opposite direction, however, the detents 24 are arranged to ride over the teeth 23 to permit the rim section to rotate relative to the hub section 21, the periphery of the rim section being preferably roughened in any suitable manner so as to increase the friction between the latter and the ground.

Having thus described the invention, what is claimed as new is:

1. In a mowing machine, the combination of a finger bar, a cutter bar designed to reciprocate relative thereto, a drive wheel, rocking shafts arranged on opposite sides of the drive wheel and formed with crank arms, means for operatively connecting said crank arms together and to the cutter bar, and means for rocking the shafts by and upon the rotation of the drive wheel.

2. In a mowing machine, the combination of the finger bar, a cutter bar designed to reciprocate relative thereto, a rocking lever pivotally connected to the cutter bar, rocking shafts formed at one end with crank arms operatively connected to the rocking lever, a drive wheel, and means for rocking said shafts by and upon the rotation of the drive wheel.

3. In a mowing machine, the combination of a finger bar, a cutter bar designed to reciprocate relative thereto, a drive wheel provided on opposite sides with annular series of ratchet teeth, rocking shafts arranged on opposite sides of the drive wheel and formed at one end with crank arms and at their other ends with pawls arranged for engagement with the respective series of teeth, and means for operatively connecting the crank arms together and to the cutter bar.

4. In a mowing machine, the combination of a frame work, a finger bar carried by the frame work, a cutter bar designed to reciprocate relative to the finger bar, a rocking lever fulcrumed on frame work and pivotally connected to the cutter bar, rocking shafts journaled in the frame work and formed at one end with crank arms connected together and to the rocking lever, said shafts being formed at their other ends with pawls, a drive wheel journaled in the frame work between the rocking shafts and provided on opposite sides with annular series of ratchet teeth designed to be engaged by respective pawls.

5. In a mowing machine the combination of a frame work, a finger bar carried by the frame work, a cutter bar designed to reciprocate relative to the finger bar, a rocking lever fulcrumed on the frame work and pivotally connected to the cutter bar, rocking shafts journaled in the frame work and formed at one end with crank arms connected together and to the rocking lever, said shafts being formed at their other ends with pawls, and a drive wheel journaled in the frame work between the rocking shafts and provided on opposite sides with annular series of ratchet teeth designed to be engaged by the respective pawls, the teeth of one series being in alinement with the spaces between the teeth of the other series, as and for the purpose specified.

In testimony whereof I affix my signature in presence of two witnesses.

CHARLES L. BERGEMAN. [L. S.]

Witnesses:
  H. K. WESTON,
  JOSEPH E. MORRIS.